United States Patent Office.

MAURICE CERESOLE, OF LUDWIGSHAFEN-ON-THE-RHINE, BAVARIA, GERMANY, ASSIGNOR TO THE BADISCHE ANILIN AND SODA FABRIK.

PRODUCTION OF NEW RED COLORING-MATTER.

SPECIFICATION forming part of Letters Patent No. 377,350, dated January 31, 1888.

Application filed November 17, 1887. Serial No. 255,402. (Specimens.)

*To all whom it may concern:*

Be it known that I, MAURICE CERESOLE, Doctor of Philosophy, a citizen of the Swiss Republic, residing at Ludwigshafen-on-the-Rhine, in the Kingdom of Bavaria and Empire of Germany, have invented new and useful Improvements in the Manufacture of a Red Coloring-Matter or Dye-Stuff, of which the following is a specification.

My invention relates to the manufacture of a red coloring-matter or dye-stuff belonging to a new class of phthaleines discovered by me and produced by the condensation of one molecule of phthalic anhydride, or of its halogen substitution products, with two molecules of meta-amidophenol, or of its alkyl derivatives. The said new class of phthaleines comprises within itself a series of coloring-matters capable of producing various shades of red in dyeing and printing, and differing from the phthaleines hitherto in use by their basic character. I therefore apply to this series of coloring-matters the generic name of "rhodamines."

The red coloring-matter or dye-stuff which forms the subject-matter of my present application for Letters Patent is an alkylized rhodamine produced by the condensation of one molecule of phthalic anhydride with two molecules of diethyl meta-amidophenol. The said diethyl meta-amidophenol, a hitherto unknown alkyl derivative of the known meta-amidophenol, may be obtained from the latter by the ordinary methods of ethylizing amido compounds—for instance, a mixture of one part, by weight, of the hydrochlorate of meta-amidophenol with about three parts, by weight, of ethylic alcohol is heated in a close digester during ten hours at a temperature of about 170° centigrade. The excess of ethylic alcohol having been recovered by distillation, the residuary hydrochlorate of crude diethyl meta-amidophenol is then decomposed by carbonate of soda, and the phenolic body thus set free is extracted with ether. The ether is distilled off, and the crude diethyl meta-amidophenol thus obtained is first purified by distillation in a current of carbonic acid. A further purification is effected by dissolving the distillate in dilute acetic acid, and by fractionally precipitating the solution thus obtained with carbonate of soda. At first the impurities are precipitated, and then a further addition of the precipitant separates oily drops, which, upon being placed in contact with a small fragment of crystallized diethyl meta-amidophenol, solidify into a white crystalline mass of the purified product. By a final crystallization from a mixture of sulphide of carbon and petroleum diethyl meta-amidophenol may be obtained in well-defined compact crystals fusing at 74° centigrade.

In carrying out my invention I take about ten parts, by weight, of the before-named diethyl meta-amidophenol and mix the same with about twelve parts, by weight, of phthalic anhydride. The mixture is then heated in an enameled digester provided with an agitator and fitted up within an oil bath, the temperature of which is kept at about 175° centigrade during from four to five hours, or until the contents of the vessel solidify into a crystalline melt possessing a dark-green metallic appearance and dissolving in alcohol with a rich crimson color. Throughout this operation the access of air, which would otherwise tend to deteriorate the product, ought to be prevented as much as possible. The melt thus produced is then allowed to cool and reduced to powder. Its principal constituent is the phthalate of my new coloring-matter, which may be obtained in a pure and well-crystallized condition by dissolving the melt in boiling alcohol and setting the solution aside to crystallize. As, however, the said phthalate is almost insoluble in water, and therefore necessitates the use of alcohol as a solvent for dyeing purposes, I prefer to convert my coloring-matter into the more convenient mercantile form of a hydrochlorate soluble in water, and I proceed as follows:

The finely-powdered melt produced from ten parts, by weight, of diethyl meta-amidophenol, as above described, is agitated during several hours, and at a temperature of about 20° centigrade, with weak caustic ammonia—say with a mixture of one hundred and sixty parts of water with ten parts, by weight, of caustic ammonia liquor containing about eighteen per cent. of $NH_3$. The base of the coloring-matter thus set free is afterward extracted by repeated shakings with benzine, and from the benzolic extracts thus obtained its hydrochlorate may then be withdrawn by agitation with the requisite amount of hot and dilute hydrochloric acid. The aqueous solutions are separated from the supernatant layer of benzine and allowed to cool. The hydrochlorate of my new coloring-matter will then be deposited in small glittering laminæ.

The red coloring-matter or dye-stuff prepared as above described presents the following characteristic properties: The composition of the free rhodamine base (dried at 100° centigrade) corresponds to the formula $C_{20}H_{10}O_3N_2Et_4$. This compound may therefore be termed "tetraethyl-rhodamine." It is capable of forming, mostly, well-defined and crystallizable salts with mineral and organic acids, from which compounds it can be set free again by treatment with caustic and carbonated alkalies or ammonia, and then be extracted from the alkaline mixture by means of benzine or ether. It is soluble in water, more readily soluble in benzine than the corresponding "tetramethyl-rhodamine", and also soluble to some extent in ligroine. From a hot solution in the latter solvent the base is deposited upon cooling in a crystalline or flocculent condition colorless or slightly pink colored; but upon the addition of a dilute mineral or organic acid the rich crimson color of the respective saline compounds of tetraethyl-rhodamine is immediately developed.

The above-described crystallized hydrochlorate of tetraethyl-rhodamine contains one molecule of hydrochloric acid. It is easily soluble in pure water with an intense crimson color. The diluted aqueous solution exhibits a brilliant orange-red fluorescence. Hydrochloric acid, when added in small quantity to a moderately-strong solution, causes the coloring-matter, after some standing, gradually to separate out in small crystalline scales possessing a metallic-green appearance. A large excess of strong hydrochloric acid turns the solution scarlety red or orange. Concentrated sulphuric acid dissolves the coloring-matter with a yellow color. An aqueous solution of the dye-stuff gets rapidly decolorized upon being treated with caustic ammonia and zinc-dust in the cold. The color, however, immediately reappears as soon as a drop of red prussiate of potash-liquor is added to the colorless solution. Tetraethyl-rhodamine imparts very pure tints, varying from pink to crimson, both to animal and vegetable textile fiber. These tints are of a more bluish cast than those produced by the corresponding employment of tetramethyl-rhodamine. Silk and wool are dyed without the aid of a mordant in a neutral dye-bath, or in a bath slightly acidulated with acetic acid. The shades thus obtained rival those which may be dyed with the brightest and bluest varieties of the eosine class of phthaleines; but they surpass the latter as far as regards resistance to air and light.

Cotton which has received a tannin mordant may be dyed with my basic coloring-matter after the manner practiced for dyeing basic aniline-colors. The shades thus obtainable are somewhat bluer and duller than those produced upon animal fiber.

What I claim as new, and desire to secure by Letters Patent, is—

As a new product, the red coloring-matter or dye-stuff (tetraethyl-rhodamine) hereinbefore described and having the characteristics above set forth.

In testimony whereof I have hereunto set my hand in the presence of two subscribing witnesses.

MAURICE CERESOLE.

Witnesses:
  HEINRICH CARO,
  FERDINAND PFEIFFER.